US008369970B2

(12) United States Patent
Allen et al.

(10) Patent No.: US 8,369,970 B2
(45) Date of Patent: Feb. 5, 2013

(54) FANTASY SPORTS NEURAL ENGINE FOR PLAYER DRAFTING

(76) Inventors: Justin C. Allen, Meadowbrook, PA (US); Thomas J. McWilliams, Bryn Mawr, PA (US); Todd A. Norton, Broomall, PA (US)

( * ) Notice: Subject to any disclaimer, the term of this patent is extended or adjusted under 35 U.S.C. 154(b) by 199 days.

(21) Appl. No.: 12/563,117

(22) Filed: Sep. 19, 2009

(65) Prior Publication Data

US 2010/0075729 A1 Mar. 25, 2010

Related U.S. Application Data

(60) Provisional application No. 61/192,601, filed on Sep. 19, 2008.

(51) Int. Cl.
*G06F 17/00* (2006.01)
(52) U.S. Cl. ............ 700/91; 463/7; 463/9; 463/42
(58) Field of Classification Search .......... 463/42, 463/7, 9; 700/90–91
See application file for complete search history.

(56) References Cited

U.S. PATENT DOCUMENTS

| | | | | |
|---|---|---|---|---|
| 6,371,855 | B1 * | 4/2002 | Gavriloff | 463/42 |
| 7,618,312 | B1 * | 11/2009 | Kasten | 463/7 |
| 8,099,182 | B1 * | 1/2012 | Kasten | 700/91 |
| 2006/0040719 | A1 * | 2/2006 | Plimi | 463/9 |
| 2007/0203591 | A1 * | 8/2007 | Bowerman | 700/90 |
| 2008/0102911 | A1 * | 5/2008 | Campbell et al. | 463/9 |
| 2008/0125228 | A1 * | 5/2008 | Ware et al. | 463/42 |
| 2008/0153589 | A1 * | 6/2008 | Baray et al. | 463/30 |
| 2008/0268951 | A1 * | 10/2008 | Gropp et al. | 463/31 |
| 2008/0280685 | A1 * | 11/2008 | Hansen et al. | 463/42 |
| 2008/0281444 | A1 * | 11/2008 | Krieger et al. | 700/91 |
| 2009/0156312 | A1 * | 6/2009 | Ng et al. | 463/42 |

OTHER PUBLICATIONS

Jesse Ellison, How to make the cell phone into a portable scanner, World News, Oct. 20, 2007.*
Todd Conrad, The Perfect Auto-Pick Draft, Footballguys.com, Aug. 8, 2007.*
Matt O'Hern, Fantasy Football for Dummies: Getting Started, Marketing Shift, Sep. 5, 2006.*
Matt O'Hern, Fantasy Football for Dummies Part 1, Marketing Shift, Aug. 25, 2006.*
Paul La Monica, Fantasy football . . . real money, CNNMoney, Aug. 11, 2006.*
Brandon Funston, One Man's Mock, Yahoo! Sports, Aug. 9, 2006.*
Will Harris, Keeper leagues: The most effective way to rebuild, ESPN.com, Mar. 6, 2008.*

* cited by examiner

*Primary Examiner* — Dmitry Suhol
*Assistant Examiner* — Jason Yen

(57) ABSTRACT

An apparatus, system and method for a neural engine for recommending picks in an on-line fantasy sport draft and in on-line fantasy trades. The apparatus, system and method may include at least one computing memory having associated therewith a plurality of rules, wherein at least ones of the plurality of rules include historical performance information for at least two fantasy sports teams in at least two fantasy sports leagues, wherein one of the at least two fantasy sports leagues is associated with the on-line fantasy sports draft, and expert information regarding the picks in the on-line fantasy sports draft. The present invention may additionally include at least one computer processor that applies ones of the plurality of rules drawn from the at least one computing memory to arrive at a recommendation.

17 Claims, 3 Drawing Sheets

FANTASY SPORTS NEURAL ENGINE FOR PLAYER DRAFTING

CROSS-REFERENCE TO RELATED APPLICATIONS

This application claims the benefit of U.S. Provisional Application Ser. No. 61/192,601, entitled "Fantasy Sports Neural Engine And Method Of Using Same", filed Sep. 19, 2008, the entire disclosure of which is incorporated by reference herein as if set forth herein in its entirety.

FIELD OF THE INVENTION

The instant invention relates to neural engines, and in particular to a rules-based neural engine for use in on-line fantasy sports games.

BACKGROUND OF THE INVENTION

A fantasy league, also referred to as a rotisserie, roto, or simulation league, is a game wherein participants act as team owners and generate a team that competes against the teams of other fantasy owners based on statistics generated by real world players or teams. Common variants track points correspondent to the statistical performance of the real world teams or players. More complex fantasy leagues use complex computer modeling of real world games. In fantasy, there is typically an ability to trade, cut, and sign players like a real sports owner.

It's estimated that 29.9 million people age 12 and above in the U.S. and Canada played fantasy sports in 2007, and 19.4 million people played fantasy sports in 2006. A 2006 study showed 22 percent of U.S. adult males 18 to 49 years old with Internet access, play fantasy sports. Fantasy is estimated to have a $3$4 Billion industry. In addition to popularity in the U.S. and Canada of fantasy based on football, baseball, basketball, hockey, golf and tennis, fantasy is popular throughout the world with leagues for soccer, Australian-rules football, cricket and other non-U.S. based sports.

The need exists for an improved fantasy draft recommendations, improved fantasy trade recommendations, and improved input of draft picks in a live fantasy draft into an online environment.

SUMMARY OF THE INVENTION

The present invention is and includes an apparatus, system and method for a neural engine for recommending picks in an on-line fantasy sport draft occurring over at least one network. The apparatus, system and method may include at least one computing memory having associated therewith a plurality of rules, wherein at least ones of the plurality of rules include historical performance information for at least two fantasy sports teams in at least two fantasy sports leagues, wherein one of the at least two fantasy sports leagues is associated with the on-line fantasy sports draft, and expert information regarding the picks in the on-line fantasy sports draft, wherein the historical information is correlated with the expert information to provide a tendency for the picks in the on-line fantasy sports draft. The present invention may additionally include at least one computer processor that applies ones of the plurality of rules drawn from the at least one computing memory to arrive at a recommended one of the picks, and at least one computing port that accesses, in accordance with at least one of the plurality of rules, the at least two fantasy sports leagues, and that allows for on-line selection of at least the recommended one of the picks.

The present invention may additionally include a computerized timer for timing between ones of the picks. An advertisement service may additionally provide at least one relevant advertisement during the timing.

The present invention may additionally include a hardware input for inputting to on-line a draft pick selection in a fantasy draft. The hardware input may read a physical representation of the draft pick, such as a sticker, and may be associated with at least one computing port. The draft pick selection may auto-populate the selected draft pick to the selecting fantasy sports team. The hardware input may be one selected from the group of a bar code scanner, an RF reader, and an OCR scanner.

The present invention may additionally include a trade comparator for providing at least one trade recommendation in an on-line fantasy sport league. The trade comparator may include at least one computing memory having associated therewith a plurality of rules, wherein at least ones of the plurality of rules include historical trade offers for at least two fantasy sports teams in at least two fantasy sports leagues, wherein one of the at least two fantasy sports leagues is associated with the on-line fantasy sports league, historical trade acceptances for the at least two fantasy sports teams in the at least two fantasy sports leagues, wherein one of the at least two fantasy sports leagues is associated with the on-line fantasy sports league, and expert information regarding relative values of players in the on-line fantasy sports league, wherein the historical trade offers and the historical trade acceptances are correlated with the expert information to provide the at least one trade recommendation.

Thus, the present invention provides improved fantasy draft recommendations, improved fantasy trade recommendations, and improved input of draft picks in a live fantasy draft into an online environment.

BRIEF DESCRIPTION OF THE FIGURES

Understanding of the present invention will be facilitated by consideration of the following detailed description of the embodiments of the present invention taken in conjunction with the accompanying drawings, in which like numerals refer to like parts and in which.

DETAILED DESCRIPTION OF THE INVENTION

Figure 1:
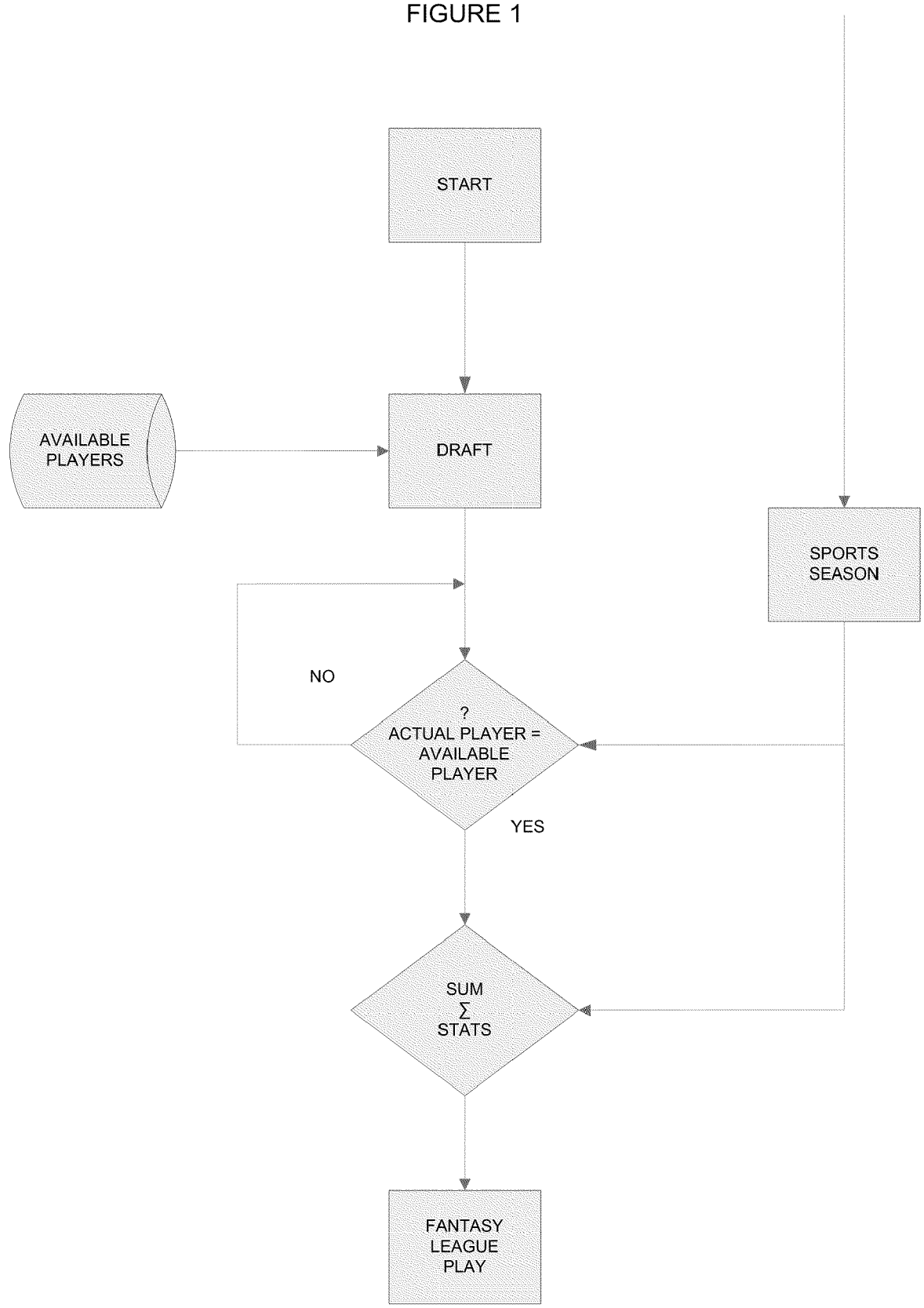
FIG. 1 is a flow chart of a fantasy draft, according to an aspect of the present invention.

It is to be understood that the figures and descriptions of the present invention have been simplified to illustrate elements that are relevant for a clear understanding of the present invention, while eliminating, for the purpose of clarity, many other elements found in typical rules-based neural engines. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

The present invention is and includes a neural engine for use in on-line fantasy sports. As used herein, the term neural network or neural engine refers to an engine or network having resident therein a plurality of rules, wherein, upon access to information to which such rules may be applied, the rules may be updated, modified, or varied as to which next set of those rules is applied. A neural engine or network would include, in brief, computer models, algorithms, comparisons, calculations and the like designed to simulate the behavior of human reasoning and learning, but additionally capable of such simulation with data quantities, breadth of calculations and the like that are beyond human capabilities, such as in pattern recognition, data accumulation, language processing, and comparative problem solving. The goal of neural networking is a learning by the network such that self-directed information processing may occur. Such an engine may be, for example, a business rules engine that is associated with one or more processors, which may be resident locally and/or at one or more servers. General requirements for construction of generic architectures for neural engines and/or networks as understood by those skilled in the art may be used in conjunction with the present invention to perform the novel functionalities as describe hereinthroughout.

Further, as used herein, the term on-line includes any network telecommunications, including, for example, PC based internet communications, intranet communications, extranet communications, cellular telephonic communications, personal digital assistant communications, and the like. Further, as used herein, the term fantasy sports is intended to refer to any recreational activity, or professional, social, or the like activity, in which real world athletes or entertainment figures are selected for placement as "players" onto a virtual team, and wherein the statistics accumulated by those real world athletes and/or entertainment figures affect the standing and/or position of that virtual team within and/or relative to, for example, a league of at least one similar team, and further wherein one or more such virtual teams, and the players thereon, are controlled or influenced by the party or user controlling the neural engine of the present invention.

In an exemplary embodiment of the present invention, and as illustrated in FIG. 1, fantasy sports leagues are often initialized upon drafting of the players who will reside on each respective virtual sports team, wherein such drafting frequently occurs before or proximate to the beginning of the subject real world sports season. For example, in a fantasy sports football league, participants in the league may draft actual National Football League ("NFL") players at any number of predetermined positions, prior to or proximate to the start of the National Football League season. Such players, upon being drafted, may have their respective statistics attributed to the fantasy sports team that drafted such player.

Figure 2:
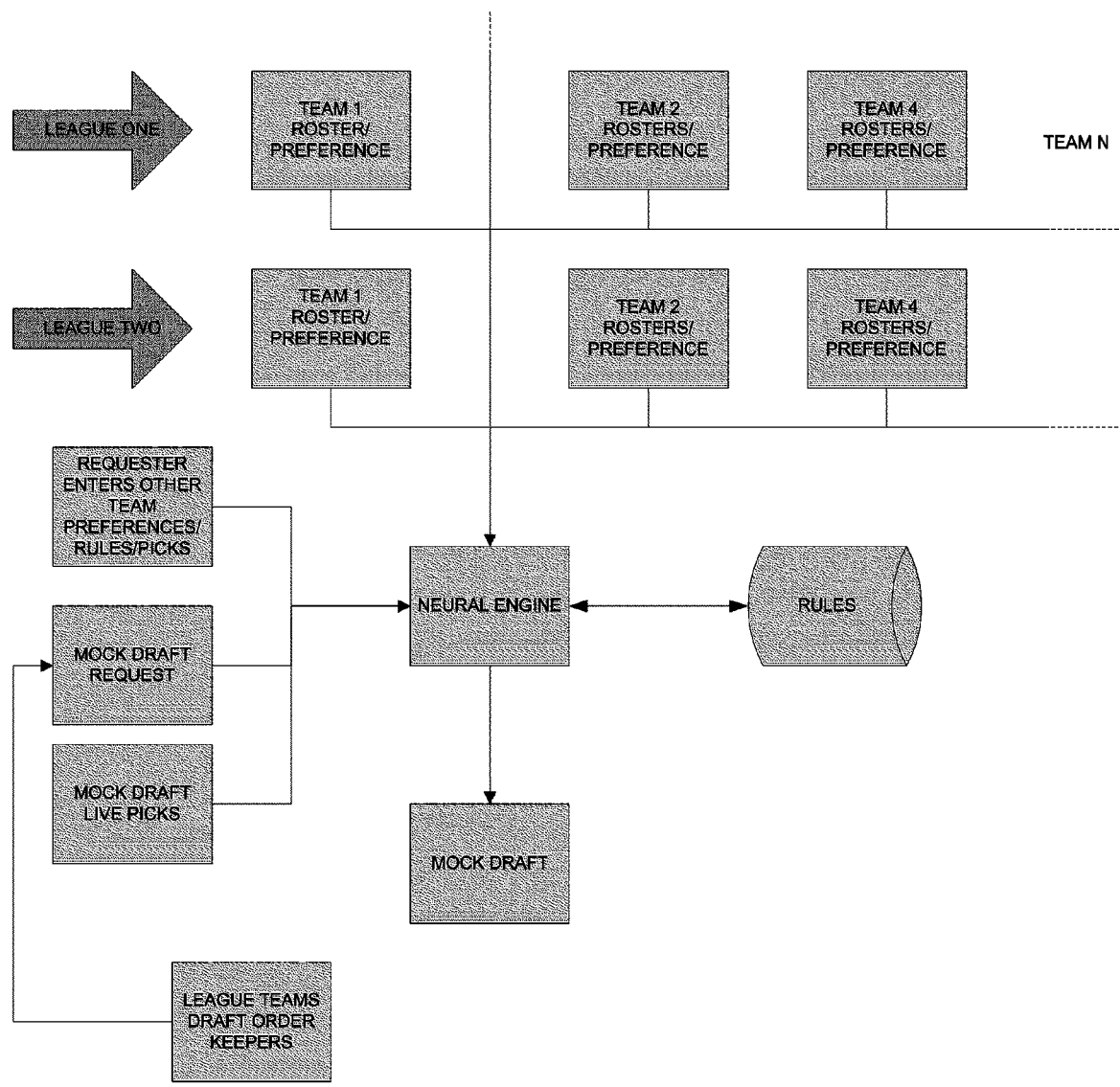
FIG. 2 illustrates a fantasy draft incorporating a neural engine, according to an aspect of the present invention.

The present invention may provide a neural engine, as illustrated in FIG. 2, that may enable one or more users in a fantasy sports league to engage in a "draft" regarding players to be drafted in that subject virtual sports league. As contemplated herein, the present invention may be used for "real" or "actual" drafts, meaning those drafts that are considered final for a fantasy league, or for a "mock" draft, meaning a preliminary or practice draft in which the draft results are not final results for a fantasy league. In a typical prior mock draft, experts or a computerized algorithm may select the players drafted by the team other than the team or teams participating directly in the mock draft, that is, expert projections are used to suggest what players will be selected in what order up to the draft pick of the team requesting participation in the mock draft. Upon the occurrence of each pick of that team in the mock draft, that team is thus informed what players should be available to that team, in accordance with the expert projections, at the time of that team's pick in that team's draft. This is referred to as a mock draft because, in typical embodiments, the subject team or teams engages in this draft as a trial before the actual draft for that player's fantasy league occurs. As used herein, the terms "draft" and "rounds" are intended to refer to any drafting mechanism employed for fantasy sports leagues, including, but not limited to, drafts in which a player's picking position within each round is randomly selected, drafts in which a players picking position is randomly selected in even numbered rounds and is "snaked" back to in odd number rounds, and drafts in which players odd numbered rounds are randomly selected and even numbered picks are snaked back to. Likewise, it is within the understanding of the present invention that, in certain sports leagues, players may be maintained, or "kept", by a fantasy team from one year to the next, and such kept players may effect a team's drafting position, or whether a team has any draft pick within certain rounds of a draft, for example.

Returning now to the exemplary embodiments of the present invention, the neural engine of FIG. 2 may allow for a participation of any team or teams within a league in a mock draft. As such, the present invention may provide the mock draft capability discussed hereinthroughout either at the same on-line location as the requesting player's league is resident, i.e., as a tool within the fantasy sports website on which the players league will occur once the draft actually occurs, or may be employed at a separate on-line location as a separate tool from the player's league location. For example, if a player participates in a fantasy league on Yahoo! Sports, the present invention may be provided as a tool to prepare that player for the draft on the Yahoo! Sports site, or the present invention may be provided on a third party website, such as for a fee on a per use, per sport, per season, or similar basis.

The neural engine of the present invention, as referenced hereinabove, includes a plurality of rules that are applied to information in order to better approximate the results of the actual draft in the mock draft than does the prior art. More specifically, the neural engine of the present invention draws on actual information related to other teams and other players in the respective sports league for which the actual draft correspondent to the mock draft is to occur.

More specifically, it is typical that players in a given fantasy sports league will participate in multiple years in that same fantasy sports league, and it is also often the case that multiple players who play together in one fantasy sports league may also play together in other fantasy sports leagues. Thus, the rules of the present invention are applied to each player's historical actions within each sports league accessible to the neural engine, to thereby provide a greatly improved projection of what each player or team in each league is most likely to do once an actual draft occurs. Needless to say, in order for the mock draft requesting player to provide access from the rules of the present invention to historical information, wherein that historical information is regarding other players in a given sports league, the requesting player may enter to the present invention other sports leagues, or all sports leagues, of which that player is a member, along with user names and passwords to enter such sports leagues, or any other methodologies of allowing an accessing by the present invention known to those skilled in the pertinent art, to thereby allow the neural engine of the present invention to access those sports leagues, and assess the players for the other teams for not only the league for which the mock draft is requested, but similarly for all leagues in which the players in the league subject to the mock draft also play against the requesting player/team. Thus, the present invention may preferably have access to the tendencies of each other player or team in the league for which the mock draft is requested across all leagues, and across all fantasy sports.

More specifically, the rules of the neural engine of the present invention may have access to rosters of the teams of interest in all leagues relating to the requested fantasy sport, and the draft history of the subject teams in all leagues, that is, what players and what position each team has a tendency to fill in each round of a previous draft, what players have been kept by the subject teams, what positions the subject teams have a tendency to keep, what are the favorite real world sports teams of the subject teams, and, to the extent such information is available on any of the subject websites, each of the subject teams typical, average, or year by year performance in sports leagues, and the like. Further, the rules may have available one or more expert projection lists as referenced hereinabove, wherein, if multiple expert lists are made available, such lists may be averaged, or weighted averaged, for example, in order to assess, as was done in the prior art, a likely mock draft selection order were one or more experts to be participating in the draft.

Thus, the neural engine of the present invention has available thereto, in essence, a likely draft order list that other teams in the subject fantasy sports league will employ or have access to when making their respective actual draft selections, as well as a series of rules forming a neural network, wherein the neural network may suggest tendencies, favorite players, favorite teams, favored positions, and the like, of other teams in the fantasy sports league. Additionally, an opposing team's historic draft may be compared against, for example, historic expert and/or magazine lists, in order to possibly assess whether an opposing fantasy player has historically used a particular list, thereby suggesting to the neural engine that particular current expert list may be used by that opposing team in a current draft. For example, the factors assessed by the aforementioned rules may be weighted, such as wherein a certain team, such as in the aforementioned NFL fantasy league example, has either kept or drafted a running back in each of the first two rounds of the actual virtual draft correspondent the subject league in four of the last five years. In such an exemplary embodiment, the rules would thus, based on this information, suggest, for example, that other team in the subject league has a 92% chance of selecting a running back in round one, and an 80% chance of selecting a running back in round two. Further, it may be that other subject team was the "winner" of that fantasy league in the preceding year, thus suggesting there was a high probability that subject team would be convinced that the strategy employed, that is, taking a running back in each of rounds one and two, would prove successful. Further, it may be the case that, based on the aforementioned results of the experts likely draft list, a running back from what has been assessed as that player's favorite football team is likely to be drafted as one of the top two running backs in the upcoming fantasy football season. Finally, it may be assessed that other fantasy team receives a high rating from the subject league's website for staying updated, that is, the subject website assesses that the subject other team has regularly been obtaining news and updates from the subject website regarding the upcoming draft for the fantasy league, and/or has historically kept abreast of the quality of available players in-season during past seasons, and/or has historically managed to avoid drafting players hurt at the last minute before a fantasy draft.

In light of the probabilities generated as discussed hereinabove in accordance with application of the rules to the subject information, the neural engine of the present invention may be enabled to formulate a modifiable draft pick selection order. More specifically, if the requesting team for the mock draft picks fourth in round one of the mock draft, and seventh in round two of the mock draft, the neural engine of the present invention may project, with far greater likelihood of success than the prior art, the likely selections of the preceding three teams in round one of the draft. At that time, the requesting team may assess the remaining available players, and make his or her selection at the number four pick of round one. The neural engine of the present invention may then generate, taking into account the player selected by the requesting team and the mock draft at pick number four, the player selected at picks number five through ten of round one, and one through six of round two (in a ten team draft), for example, in part by employing the information to which the rules were applied, and the probability factors generated by the rules as to which players were most likely to be selected, to provide a greatly increased likelihood that the mock draft selections for the opposing teams in a given fantasy league will be more likely to occur in the actual draft of the fantasy league. At that time, the requesting team may make selection number seven in round two, which will again modify the available players, and which will thus also effect the options available to the players selecting thereafter in round two and in round three prior to the next selection of the requesting team, which will therefore, of course, be at least partially affect the probabilities of which players will be selected by those subject teams.

Thereby, the present invention provides a neural engine that may login as the requesting player, such as to one or more fantasy league websites, may access any of a myriad of information regarding the requesting team and the other teams in the league with that requesting team, wherein such information may be gained from any website via, for example, a normalization engine as will be understood to those skilled in the art, and the neural engine of the present invention may apply rules to that information to generate a plurality of probability factors as to which players will be selected from an expert list by the actual owners, or managers, of the other teams in the fantasy sports league that is the subject of the requested mock draft.

More specifically, for example, after logging in and retrieving information regarding the actions and attributes of other fantasy team managers, the neural engine may further perform a comparison of the managed teams to identify and match the same team manager across different fantasy teams in one or more fantasy leagues. Such comparison may be made, for example, by matching email addresses for each team manager. If the email addresses of the managers are identical, the neural engine may determine that these teams are owned and managed by the same manager, and attribute collected information accordingly. If the email addresses are not identical, but contain a variable percent identity match (such as greater than 50% of the email characters match), the neural engine can query the user to see if these two managers are, in fact, the same. Likewise, even in the case of a 100% identical match, the user may override the neural engine to proceed as if the compared managers are different or the same entity. In another example, the same rules as described above for comparison of manager email addresses may be used when comparing the names of the fantasy teams. In such a case, the neural engine may again query the user to ask whether or not the identical or similarly named teams are managed by the same manager. Thus, the mock draft requester may, throughout the present invention, enter preferences, modify rules, or change picks or identities, among other actions, for example, to obtain the most realistic mock draft possible.

Needless to say, the neural engine of the present invention may also be employed with regard to other options available to a team in a fantasy league that are dependent on the cognitive processes of other owners in the subject fantasy league, such as proposed fantasy league trades, for example. In such other embodiments, the neural engine may assess, for example, the typical fairness of trades proposed or engaged in by the proposing team, may access an experts' list or an average of experts' lists that allow for a suggested fairness of the proposed trade by the neural engine of the present invention, and/or the neural engine of the present invention may provide a projection of the likely effect, in fantasy sports points or a similar measuring mechanism, on all teams in the league were the proposed trade to be accepted. Other factors, such as those referenced hereinabove with regard to the mock draft exemplary embodiment, may also be employed by the neural engine of the present invention in deciding whether or not to recommend that the proposed trade occur. The outcome of this exemplary embodiment may be, for example, the recommendation of one or more counter proposed trades, which may, for example, be rated on a fairness scale, that is, as more fair to one team or to the other, or as most fair to both teams, or may be simply given a green light, a red light, a thumbs up, a thumbs down, or the like. Needless to say, such a trade evaluation system may be used not only to evaluate trades offered, but to customize a trade to be potentially offered in the future. In other words, the present invention may also be used to construct trades based on information pertaining to, without limitation, published knowledge, expert opinion and personal and/or historical preferences of the subject or a targeted recipient fantasy team manager(s).

Thus, the neural engine of the present invention uses information gained through application of rules to evaluate prior, current, or future actions of the requesting user. For example, the neural engine, based on application of the rules and the probabilities gained thereby, may give a requesting user pointers in real time during a mock draft, such as before or after a pick is made. Needless to say, in certain modes, it may be more advantageous to provide such suggestions or pointers after a pick is made during a mock draft, not only to enforce the typical rules that would be enforced during an actual draft, i.e., no withdrawing a pick once a pick is made, but additionally to allow for the requesting user to engage in a first mock draft, accumulate a series of pointers, and then purchase additional mocked draft eligibilities to see if the user can improve draft outcomes using the pointers gained.

For example, during a mock draft, the requesting user in an NFL fantasy league may select a running back. The neural engine may recognize, based on the information and probabilities available to the neural engine, that, of the four teams that will pick between the requesting user's selection of a running back and the user's next selection when the draft order returns to that user, three of those other teams have either kept or already drafted a running back, and further that there is one other running back that the experts rate as approximately equivalent to the running back the requesting user just selected. As such, the neural engine may provide a recommendation that the requesting user would have had a very high probability that either the running selected or the equivalent running back would have been available at the requesting user's next pick, i.e., five picks after the requesting user's current pick, and consequently the requesting user should not waste the earlier pick on the running back that was just selected when the requesting user engages in that user's actual draft.

In an additional exemplary embodiment, the neural engine may provide a suggestion before a pick is made. For example, in a baseball draft, the neural engine may suggest that, as rated by the experts, there is a single shortstop available in a first tier of shortstops when a requesting user is about to pick in a mock fantasy baseball draft, and the neural engine may similarly suggest that all mock teams other than the requesting user's team have already selected a starting first baseman, thereby making it unlikely that any of those other teams will select another first baseman in the current or immediately subsequent rounds, and further that there are five first tier second basemen still available in accordance with the expert's ratings. Thus, the rules of the neural engine may provide the suggestion or conclusion that, because it is likely a first baseman will be available in a subsequent round, and it is unlikely that all five first tier second basemen will be selected before the following round, the requesting user should take the last remaining top tier shortstop with the user's current pick. Needless to say, this mock draft selection will be much more highly predictive than prior art draft selection recommendation engines, at least in that the neural engine of the present invention has learned and applied, in advance of the actual draft rather than during the actual draft, what the tendencies and the preferences of the competitor teams will be.

In yet an additional exemplary embodiment, the neural engine may recognize that, of the eight teams in a mock draft that will pick before the next pick of a requesting user, only one of the eight teams has any history of taking a backup (or additional) quarterback before round eight. As such, if the requesting user is currently making a selection in round seven, there is a ⅞ chance that the requesting user need not take a quarterback in round seven, but rather may wait to select a quarterback until at least round eight.

Additionally, the neural engine of the present invention is a learning engine. That is, the neural engine may track, based on its accessibility to the requesting user's actual fantasy leagues, the actual draft outcome of the draft to which the neural engine prepared a mock draft, and may thus gauge the success rate of the neural engine predictions for each team's selection. The neural engine may then feed back that information to improve the success rate of prediction for some or all of the opposing teams for the next mock draft in that fantasy sport or a different fantasy sport.

While the aforementioned exemplary embodiments describe the use of the neural engine in a mock draft, it almost goes without saying that the neural engine may also be used in a live draft. In this embodiment, the user may manually fill draft picks, or have auto filled draft picks as the draft progresses, and thus may allow the neural engine to learn, predict and recommend to the user as described hereinthroughout during an actual draft. For example, existing engines simply suggest, during a live draft, what player to pick based on those players already picked, and optionally employ a preset, static ranking of all available players, while the present invention may suggest a player based not only on prior picks, but also on a projection of what other teams or managers participating in the draft will do subsequent to a current pick. Of course, the certainty probability of each such projection will improve as each actual pick is made.

Returning now to the trade predictor aspects of the present invention, the neural engine may compare the trade proposal and the players in the trade proposal based on any statistical measure and/or any fantasy sports scoring schema.

It will be understood by those skilled in the art in light of the disclosure herein that the neural engine of the present invention, as discussed hereinabove, may rate a suggested trade, and in so doing may recommend the addition or removal of players until the value parameters of the trade meet preexisting requirements. Likewise, one of the parameters assessed by the neural engine when vetting a trade may be the value of players currently on other teams, that is, those teams that may not be involved in the presently suggested trade. Thereby, the neural engine provides a platform for suggesting multi-team trades, rather than the typical two team trades, in order to improve the fairness of trade proposals.

In accordance with the aforementioned trade proposal assessments, teams in a given fantasy league may be rated as to their respective quality as trading partners, either or both for the trades they suggest or the trades they accept. For example, by providing access to the user's league or leagues and attributing historical information of that user and the other fantasy managers in those leagues, each team may be assessed as to its trading prowess, thereby signaling other teams as to that team's ability to successfully agree on trades. Similarly, the number of trades or proposed trades a team engages in, both successfully and unsuccessfully, in a given year or over some other predetermined time frame, may allow for a team to be given an additional trade rating. Finally, either with respect to rating a team's trading prowess or simply for feedback as to what trades should or should not have been engaged in, the neural engine of the present invention may allow for back-testing of previously executed trades that were not assessed by the neural engine. Needless to say, this would also allow for the neural engine to rate the trading prowess of a given fantasy team manager, and to decide whether or not it would have suggested that such a trade go through, and, based on the subsequent results of the trade, the neural engine would be enabled to learn whether its suggestion would have been correct or incorrect, thereby allowing for further refinement of the neural engines rules.

Figure 3:
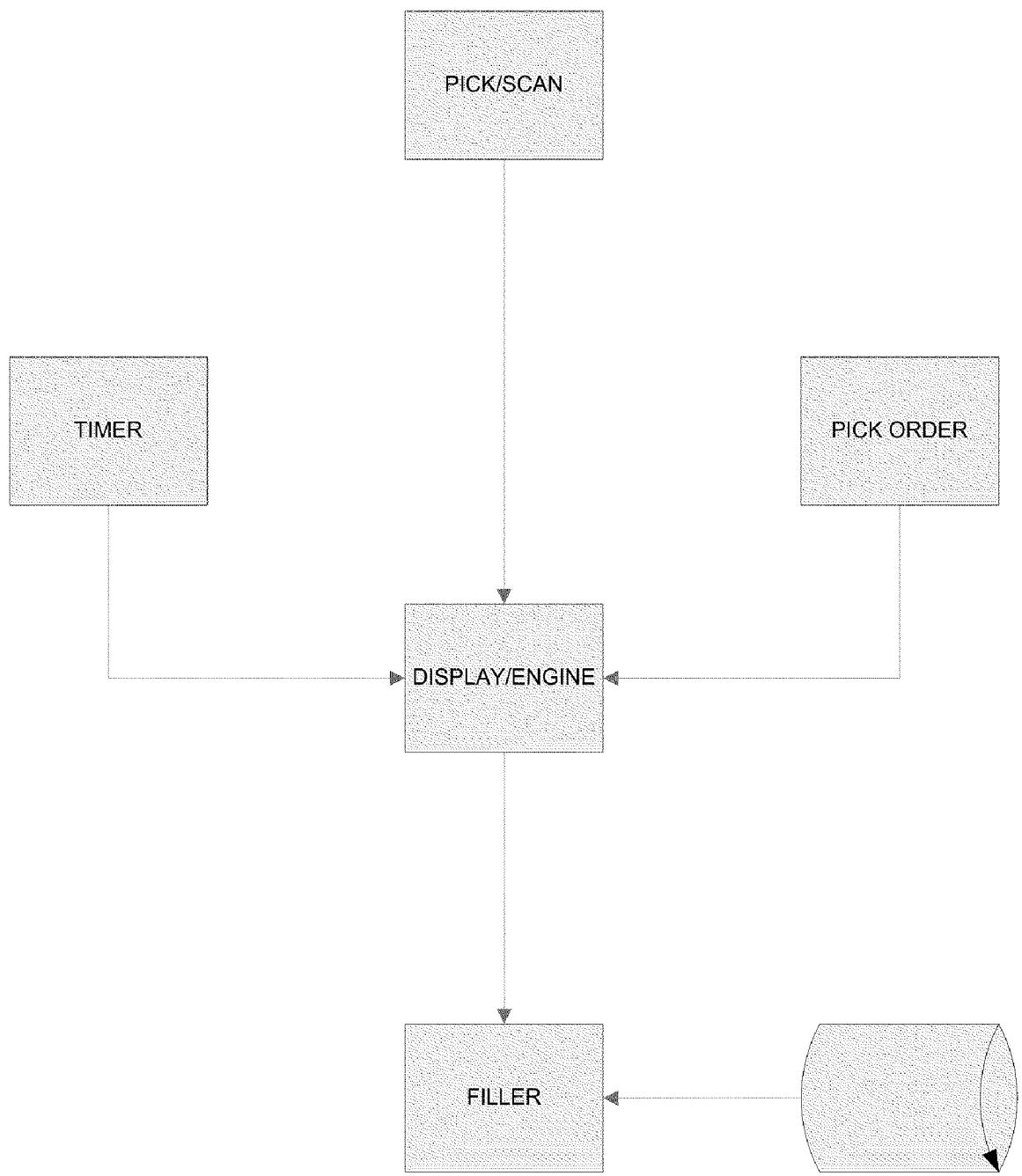
FIG. 3 illustrates a drafting environment having a visual display, according to an aspect of the present invention.

Also related to the neural engine of the present invention in general, and more specifically to any and all fantasy sports leagues, is a draft tool to assist in filling on-line fantasy sports rosters. Many leagues engage in either on-line or "live" drafting. In such cases, it is typical that the drafting entity that is currently "on the clock", that is, the party that is presently expected to make a draft selection, is given a specified allowable time frame within which to make such a selection. The present invention advantageously provides such a timer, such as, for example, providing a digital or analog clock on a computer screen that may be displayed to the teams then participating in the draft, and wherein the time given to each team to allow that team to make its selection may be decided in any of a number of ways, such as entry by the commissioner, or vote by the members of the league, for example. Needless to say, the time made available may vary from round to round, such as wherein two minutes is given in the first three rounds of a draft, one minute is given in the next ten rounds of a draft, and thirty seconds is allowed for all rounds of a draft thereafter. Thereby, as depicted generally in FIG. 3, the present invention may provide a clock that may count down the time remaining for a team to make its selection, and which clock may stop counting down when such a selection is made. The making of a selection may be indicated to a subject computer from any computing terminal connected to a network on which the present invention is available, such as by hitting the enter key at the computing terminal or hitting a pick button connected to, for example, a port on the computing terminal, such as a USB port on the computing terminal, and that simply indicates to the present invention that a draft selection has been made. It almost goes without saying, to the extent a user has accessible to the user a website on which the presently drafting fantasy sports league is provided, the user may preferably be enabled to toggle between the timer of the present invention and that user's fantasy sports website or other aspects of that fantasy sports website, such as research and statistics.

In relation to the timer discussed hereinabove, the present invention may additionally provide a "ticker", wherein such ticker displays a certain number of previous selections, or the selections previously selected by the currently selecting team, or selections made by other teams in that team's division, for example. The upcoming draft order of teams to select a player may also be shown, such as a scrolling list of upcoming fantasy teams in the current round, or simply an "on deck" and "in the hole" slot to identify the next two teams set to make a selection. Such a ticker may be made available in any number of ways, including, real time manual entry of the players selected by each drafting team as those selections are made. Needless to say, such manual entry provides an inconvenience, particularly where the time window that is allowable in which to make a pick is small. However, the present invention advantageously provides an automated methodology whereby draft picks may be entered via computing terminal in real time.

This methodology provided by the present invention may entail the inclusion of stickers, paper, or the like, on which the names of players available to be drafted are included, and which stickers or the like include thereon one or more identifying characteristics. Such identifying characteristics may be, for example, a barcode, a numeric code, an RF tag, or the like, and such identifying characteristics preferably uniquely identify, within a database associated with the software of the present invention, at least a unique player, a position of the player, and a real world team of the player, previously associated with the unique identifying characteristic. Thereby, operating under the assumption that, in the above example, an allowable time per round, as well as a draft order, has been entered to the present invention, the present invention is aware of which team is currently drafting, and, if a physical scan of a sticker having a unique identifying characteristic is made at the time that sticker is placed on to a draft board, in a live draft for example, or a computerized code is scanned as the pick is made and placed on an on-line draft board, for example, the draft clock in the aforementioned example may stop due to the making of a selection, the player scanned is automatically included on the team performing the scan, and a real time update occurs as to the remaining available players and positions thereof, the upcoming teams picking, and the roster to which the preceding selection was just added.

In a physical embodiment, such a scan may include, for example, scanning a sticker on an OCR scanner, scanning a sticker with a barcode or pen scanner communicatively connected to a computing terminal and/or processor, which computing terminal and/or processor may preferably be resident at the draft location, or bringing the sticker in proximity to an RF tag reader, for example. Such a scanner, such as an OCR scanner, a bar code scanner, an RF reader, of the like, may be made available to the computer processor via a USB port, for example. Needless to say, as discussed hereinabove, to the extent uniquely identifying characteristics are used to indicate that a fantasy team has made its draft selection, such a scan of an identifying characteristic may indicate to the draft clock and the draft order that a selection has been made, and consequently, in such an embodiment, hitting a button, such as the enter key, at the computing terminal, may no longer be necessary.

The present invention may be communicatively connected to a computer monitor, TV or other visual terminal, and thus the present invention may also provide "filler" audio-visual media between draft picks, such as based upon, and scheduled according to, the amount of time available between picks. Such media may be in any electronic form, be it an electronic file or a streaming feed, as understood by those skilled in the art, for example. Media may further be stored locally on a resident system, may be resident on a CD or DVD that comes in a "draft kit," or retrieved from one or more remote databases communicatively connected to the present invention, for example.

The filler media may be any sort of media relevant to the concurrently running draft. For example, the media may be recorded video clips of the most recently selected player playing in an actual game, such as a "highlight" clip. It may also be a pre-recorded video of the most recently selected player saying an entertaining phrase, such as "you picked me in what round?", or "I have to be on your team?", for example. As can be appreciated, any sort of media can be used to provide entertainment between entered draft picks. Advertisements may also be played, for example. In another embodiment, the rules-based neural engine can use the collected and/or learned information as described above, along with the progressing draft picks, to determine entertaining facts associated with the selected player, such as determining the selected player's value to that fantasy team, rating the player selected, determining statistical advantages or disadvantages, comparing historical information for that fantasy team manager, for example, and present positive or negative commentary regarding that most recently selected player, for use as "filler" media.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A neural engine, comprising: at least one computing memory having associated therewith a rules engine, wherein at least a plurality of rules included in the rules engine comprise: historical performance information for at least two fantasy sports teams in at least two fantasy sports leagues, wherein one of the at least two fantasy sports leagues is associated with the on-line fantasy sports draft;

historical expert information regarding the picks in the on-line fantasy sports draft; wherein said historical information of at least one other fantasy manager is compared against said historical expert information to assess if the picks of the at least one other fantasy manager are based on an at least partially non-statistical tendency for the picks of the at least one other fantasy manager in the on-line fantasy sports draft;

at least one computer processor that applies the plurality of rules drawn from said at least one computing memory to provide a recommended one of the picks based on the at least partially non-statistical tendency for picks of the at least one other fantasy manager;

at least one computing port that accesses, in accordance with at least one of the plurality of rules, the at least two fantasy sports leagues, and that allows for on-line selection of at least the recommended one of the picks.

2. The neural engine of claim 1, wherein the on-line fantasy sports draft occurs over one selected from internet communications, intranet communications, extranet communications, cellular telephonic communications, and personal digital assistant communications.

3. The neural engine of claim 1, further comprising an entry tool associated with the at least one computing port for user entry of log-in information for each of the at least two fantasy sports leagues.

4. The neural engine of claim 1, wherein said historical information comprises rosters.

5. The neural engine of claim 1, wherein said historical information comprises prior draft results.

6. The neural engine of claim 1, wherein said historical information comprises keepers.

7. The neural engine of claim 1, wherein said historical information comprises prior performance.

8. The neural engine of claim 1, wherein said historical information comprises prior used ones of the expert information.

9. The neural engine of claim 1, wherein the correlation comprises a statistical probability estimate.

10. The neural engine of claim 1, wherein the plurality of rules further comprises a matching engine that identifies ones of the at least two fantasy sports teams correspondent to a single owner.

11. The neural engine of claim 10, wherein the matching engine comprises a variable percent identity matching engine.

12. The neural engine of claim 1, wherein the on-line fantasy sports draft comprises a mock draft.

13. The neural engine of claim 1, further comprising a computerized timer for timing between ones of the picks.

14. The neural engine of claim 13, further comprising an advertisement service for providing at least one related advertisement during the timing.

15. The neural engine of claim 1, further comprising a hardware input for the on-line selection of the recommended one of the picks, wherein said hardware input is associated with said at least one computing port.

16. The neural engine of claim 15, wherein the on-line selection comprises an auto-populate of the recommended one of the picks to one of the at least two fantasy sports teams.

17. The neural engine of claim 16, wherein said hardware input comprises one selected from the group consisting of a bar code scanner, an RF reader, and an OCR scanner.

* * * * *